US008570555B2

(12) United States Patent
Takeyama

(10) Patent No.: US 8,570,555 B2
(45) Date of Patent: *Oct. 29, 2013

(54) IMAGE FORMING APPARATUS WITH AN IDENTIFICATION CONTROL UNIT HAVING AN IDENTIFICATION SIGNAL LINE, A DATA LINE, AND A PERIOD SIGNAL LINE

(75) Inventor: Yoshinobu Takeyama, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 921 days.

This patent is subject to a terminal disclaimer.

(21) Appl. No.: 12/285,492

(22) Filed: Oct. 7, 2008

(65) Prior Publication Data

US 2009/0097065 A1 Apr. 16, 2009

(30) Foreign Application Priority Data

Oct. 12, 2007 (JP) ................................. 2007-265982

(51) Int. Cl.
G06F 3/12 (2006.01)
G06F 3/00 (2006.01)
G06F 13/28 (2006.01)
G03G 15/00 (2006.01)
G03G 21/14 (2006.01)

(52) U.S. Cl.
USPC .................. 358/1.15; 399/46; 399/76; 710/1; 710/3; 710/20; 710/25

(58) Field of Classification Search
USPC .......... 399/38, 46, 76; 710/1, 3, 4, 16, 20, 21, 710/25, 26
See application file for complete search history.

(56) References Cited

U.S. PATENT DOCUMENTS

| 5,991,446 A * | 11/1999 | Terane ......................... 382/232 |
| 2004/0165905 A1* | 8/2004 | Lee ................................. 399/75 |
| 2005/0034026 A1* | 2/2005 | Swaine et al. .................. 714/43 |
| 2008/0019710 A1 | 1/2008 | Takeyama |
| 2008/0212127 A1 | 9/2008 | Takeyama |

FOREIGN PATENT DOCUMENTS

| JP | 2002-258691 | 9/2002 |
| JP | 2003288103 A * | 10/2003 |
| JP | 2006-218682 | 8/2006 |

OTHER PUBLICATIONS

JP-2005182505—abstract.*
JP-2003288103—abstract.*

* cited by examiner

*Primary Examiner* — Fan Zhang
(74) *Attorney, Agent, or Firm* — Harness, Dickey & Pierce, P.L.C.

(57) ABSTRACT

An image forming apparatus that can reduce the number of signal lines that can respond to interrupt processing by conducting I/O control that can acquire irregularly generated sensor detection signals. Identification control means of the image forming apparatus uses the data line in the period other than when conducting identification control of the detection means or the drive means to acquire the data of the specified detection means as valid data. Delay of the detection response time to irregularly generated signals can be minimized by using the data line other than when conducting identification control of the detection means or the drive means to acquire irregularly generated detection signals.

11 Claims, 11 Drawing Sheets

IMAGE FORMING APPARATUS WITH AN IDENTIFICATION CONTROL UNIT HAVING AN IDENTIFICATION SIGNAL LINE, A DATA LINE, AND A PERIOD SIGNAL LINE

BACKGROUND OF THE INVENTION

1. Field of the Invention

The present invention relates to an image forming apparatus; specifically relates to an image forming apparatus such as a copying machine and a printer device using an electrophotographic system or an inkjet system; and more particularly relates to an image forming apparatus that can respond to interrupt processing when the number of signal lines is reduced.

2. Description of the Related Art

A copying apparatus with an electronic photographic system has various types of units that can be freely interchanged by attaching and detaching to the main body of the apparatus, and is driven and controlled by image forming control means having a CPU in the main body of the image forming apparatus. Signals indicating the attachment/detachment status of these various kinds of interchangeable units with the main body of the apparatus are input to the image forming control means as input signals from detection means provided in each unit.

In recent years, with the development of color, high performance and multi-capability image forming apparatuses, there has been a tendency to increase the number of signal lines for the input signals from the various types of detection means and for the output signals to the actuators. Moreover, to use the various types of detection means and actuators, a power supply other than the detection results signals and the drive signals is necessary. In order for the image forming control means to input and output detection signals from the these numerous detection means and drive signals to the drive means, numerous signal lines and power source lines are necessary, and the image forming control means becomes large. Moreover, the image forming control means is set up in a location separated from the various units and detection means, and therefore numerous signal lines wind around inside the apparatus, which is a great impediment to making a simplified, small-scale and low cost apparatus.

In order to prevent the proliferation of signal lines in this way, image forming apparatuses such as that indicated, for example, in Japanese Unexamined Patent Application No. 2002-258691 (Prior Art 1) provide an I/O expander in each unit, and the number of image forming control means and unit connection signal lines are reduced by the image forming control means identifying the kinds of units from the status of the input port of the I/O expander.

Moreover, image forming apparatuses such as that indicated in Japanese Unexamined Patent Application No. 2006-218682 (Prior Art 2) are set up with the transfer clock at the L level, the transfer data acquired when the transfer clock starts up is taken as image serial data, and the image serial data and the control signals are transferred using a common data signal line by taking the data transfer start up signal when the transfer clock is at the H level as the control signal.

When the image forming control means forms an image, it is necessary to carefully control the drive means and actuators corresponding to the operational status inside the apparatus and to the status at a plurality of locations in the apparatus. In order to carefully control the drive means and actuators in this way, by identifying the types of units from the status of the input port of the I/O expander of the various units as indicated in Prior Art 1, the number of image forming control means and of unit connection signal lines becomes smaller, and even if the image serial data and control signals are transferred by common data signal lines as indicated in Prior Art 2, the number of signal lines for input to the image forming control means and the number of signal lines for output is enormous, and the apparatus becomes complicated and difficult to make compact.

Thus, by using an I/O control method that places signals from a plurality of status detection means (sensors) or drive control signals to a plurality of drive means on one shared signal line, the enormous number of data input/output lines of the image forming apparatus is reduced, and at the same time, versatility is maintained such that accommodation can be made without increasing the number of signal lines even if the image forming system configuration is modified by increasing or decreasing the number of detection means or actuators. Here, because the I/O means data is necessarily transacted from the main controller, the I/O control method uses extensive interrupt processing and is not adapted for acquiring irregularly generated signals.

SUMMARY OF THE INVENTION

The present invention attempts to resolve these problems, and an object of the present invention is to provide an image forming apparatus that can reduce the number of signal lines able to respond to interrupt processing by conducting I/O control that can acquire irregularly generated sensor detection signals.

In an aspect of the present invention, an image forming apparatus comprises an image forming control device for controlling the operations of the apparatus as a whole; a plurality of detection device for detecting various states within the apparatus serving as a plurality of input/output means in relation to the image forming control device; a plurality of drive devices for driving a plurality of actuators such as motors, solenoids and the like; and an identification control device connected with the image forming control device by: a data line for transmitting/receiving detection signals from the plurality of detection device to the image forming control device, or drive signals from the image forming control device to the plurality of drive device; an identification signal line for transmitting signals that specify the input/output of the data line, and identification signals that specify one detection device or one drive device from among the plurality of detection device and the plurality of drive device; and a period signal line for transmitting period signals that define a data valid period of the data line and a signal valid period of the identification signal line for specifying the input/output of data and the detection device or drive device; the identification control device identifying appropriate detection device or drive device from the identification signals, and making data on the data line valid as data of the appropriate detection device or the drive device. The identification control device uses the data line in a period other than when conducting identification control of the detection device or the drive device to acquire the data of the specified detection device as valid data.

In another aspect of the present invention, an image forming apparatus comprises an image forming control device for controlling the operations of the apparatus as a whole; a plurality of detection device for detecting various states within the apparatus serving as a plurality of input/output device in relation to the image forming control device; a plurality of drive device for driving a plurality of actuators such as motors, solenoids and the like; and an identification control device connected with the image forming control device by: a data line for transmitting/receiving detection signals from the plurality of detection device to the image forming control device, or drive signals from the image forming control device to the plurality of drive device; an identification signal line for transmitting signals that specify the input/output of the data line, and identification signals that specify one detection device or one drive device from among the plurality of detection device and the plurality of drive device; and a period signal line for transmitting period signals that define a data valid period of the data line and a signal valid period of the identification signal line for specifying the input/output of data and the detection device or drive device; the identification control device identifying appropriate detection device or drive device from the identification signals, and making data on the data line valid as data of the appropriate detection means or the drive device. The identification control device uses an unused period of the data line to acquire the data of the specified detection device as valid data.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT(S)

Before describing the present invention, the problems with conventional technology will be explained by referring to the diagrams.

Figure 1:
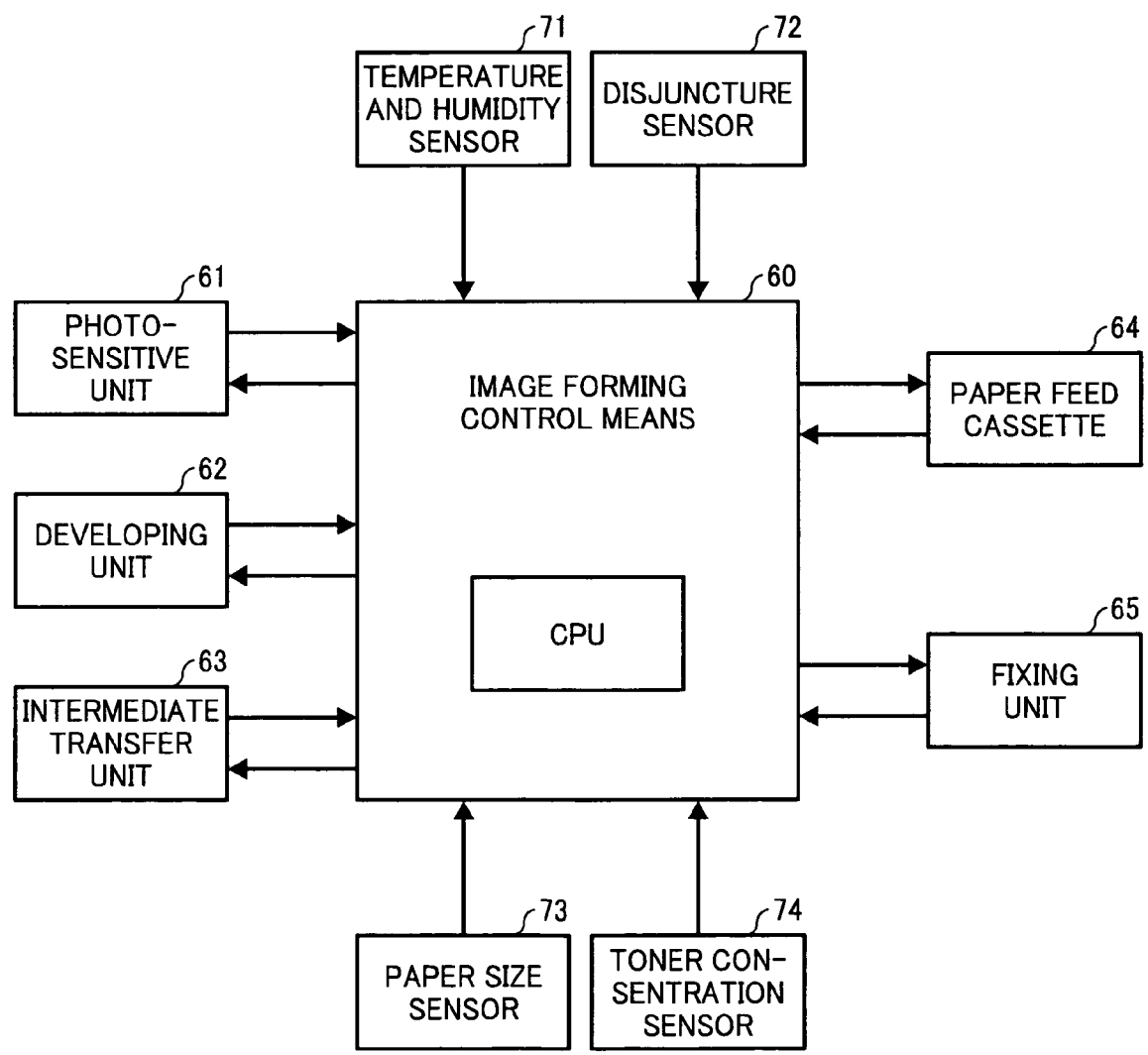
FIG. 1 is a block diagram indicating the configuration of a conventional image forming apparatus.

As indicated in FIG. 1, a copying apparatus with an electronic photographic system has a photosensitive unit 61 that forms an electrostatic latent image on a photosensitive body, a developing unit 62 that can visualize by developing the electrostatic latent image formed on the photosensitive body, an intermediate transfer unit 63 that laminates visualized images of various colors, and various types of units that can be freely interchanged by attaching to or detaching from the apparatus proper such as a paper feed cassette 64 that houses and sends recording paper for transferring images, and a fixing unit 65 that fixes the transferred image onto the recording paper; and drive control is conducted by image forming control means 60 that has the CPU of the image forming apparatus proper.

Signals indicating the attachment/detachment status of these interchangeable units with the apparatus proper are input to the image forming control means 60 as input signals from the detection means provided in relation to the various units. Moreover, other input signals to the image forming control means 60 include the detection signals from a variety of detection means such as: a temperature and humidity sensor 71 for detecting the temperature and humidity inside and outside the apparatus, a disjuncture sensor 72 for detecting position and status information such as that of the recording medium, and of a connect/release mechanism to be driven when forming an image, a paper size sensor 73, and a toner concentration sensor 74. The signal lines for this paper size sensor 73 and the paper feed cassette sensor and the like at the mounting part of the paper feed cassette 64 are multi-bit, and the number of signal lines is greatly increased. In addition, there are also feed back signals, and the like from the high voltage power source.

Moreover, the units have a plurality of actuators such as motors, solenoids, and clutches, and the drive signals (data signals) to the drive means that drives these actuators are output as output signals from the image forming control means 60.

In this kind of conventional image forming apparatus described above, the number of signal lines for input signals from the various detection means and output signals to the actuators tends to increase as color, high performance and multi-capability image forming apparatuses are developed. Moreover, in addition to the detection results signals and drive signals it is necessary to have power supplies in order to use the various detection means and actuators. In order to input/output to the image forming control means 60 these numerous detection signals from the detection means and drive signals to the drive means, a plurality of signal lines and power source lines are necessary, which increases the scale of the image forming control means 60. In addition, because the image forming control means 60 is installed at a location separated from the various units and detection means, numerous signal lines wind around inside the apparatus, which is a great impediment to making a simplified, small-scale and low cost apparatus.

Figure 2:
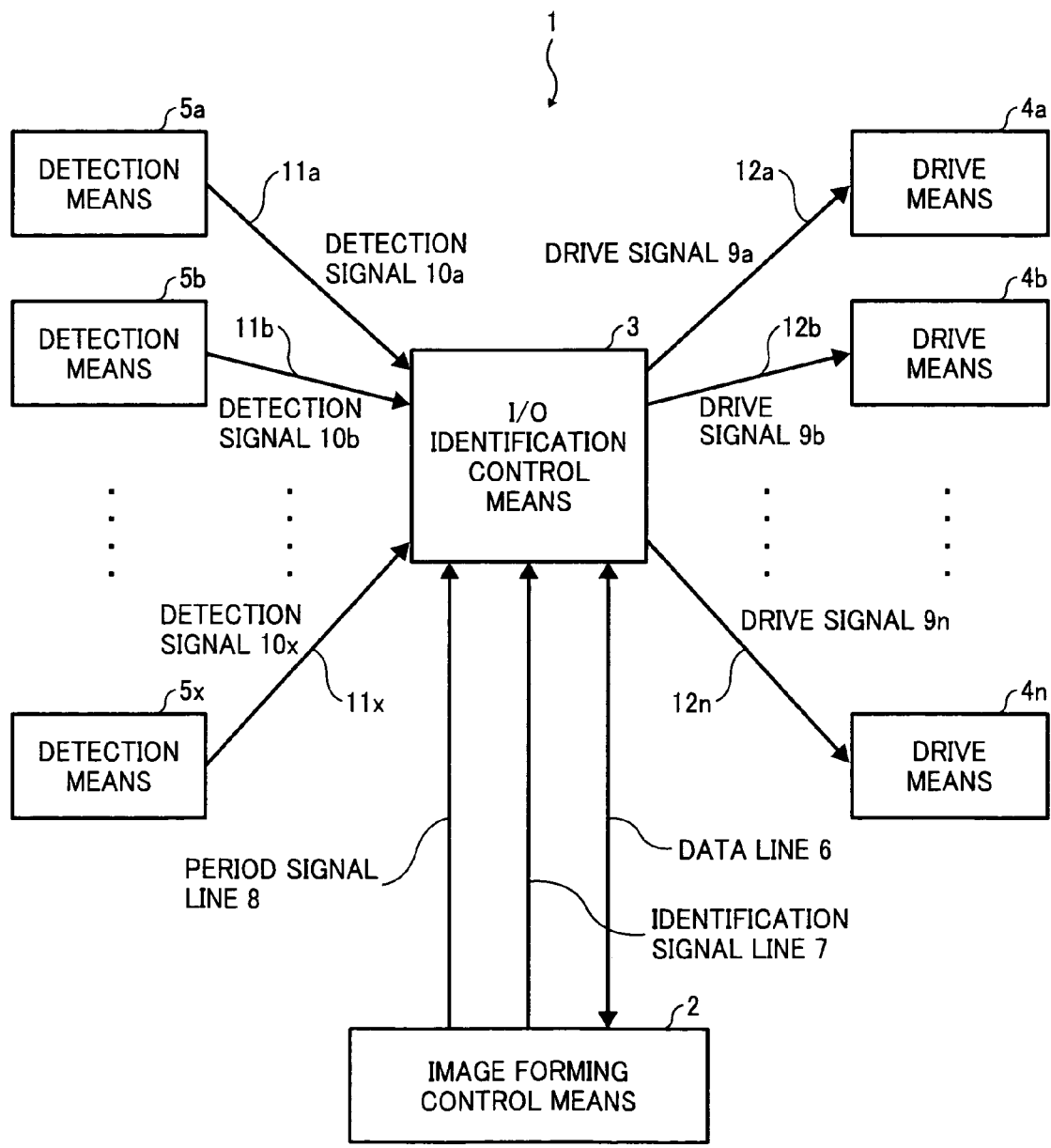
FIG. 2 is a block diagram indicating the configuration of the basic engine of an image forming apparatus of the present invention.

FIG. 2 indicates the configuration of a basic engine of an image forming apparatus of the present invention. As indicated in the same diagram, an image forming apparatus 1 has image forming control means 2 for controlling the operation of the apparatus as a whole, I/O identification control means 3, a plurality of drive means 4a to 4n as input/output means, and a plurality of detection means 5a to 5x. The drive means 4a to 4n, for example, are provided for driving the actuators within the various units such as a photosensitive body unit, a developing unit, an intermediate transfer unit, and a fixing unit, which form an image using, for example, an electrostatic system. The detection means 5a to 5x detect the various states of the apparatus such as the attachment/detachment status and operational status of the various units. In addition, the image forming control means 2 and the I/O identification control means 3 are connected by 3 signal lines, namely, data line 6, identification signal line 7, and period signal line 8.

According to the image forming apparatus of the present invention having this kind of configuration, identification signals and period signals are input to the I/O identification control means 3 from the image forming control means 2 that conducts control around the engine of the image forming apparatus. Between the plurality of detection means 5a to 5x and drive means 4a to 4n and the I/O identification control means 3 installed nearby binary data (1 or 0), which are the results of detecting the status of the respective objects to be detected of the plurality of detection means 5a to 5x are transmitted and received, or ADC multi-bit serial data, and drive signals 9a to 9n to the respective targets to be driven of the plurality of drive means 4a to 4n are transmitted and received. Then, through the data line 6, the detection signals 10a to 10x, which are the detection results of the plurality of detection means 5a to 5x, are input as detection data from the I/O identification control means 3 to the image forming control means 2, and the drive signals 9a to 9n to the respective targets to be driven of the plurality of drive means 4a to 4n are output from the image forming means 2 to the I/O identification control means 3 as drive control data.

Figure 3:
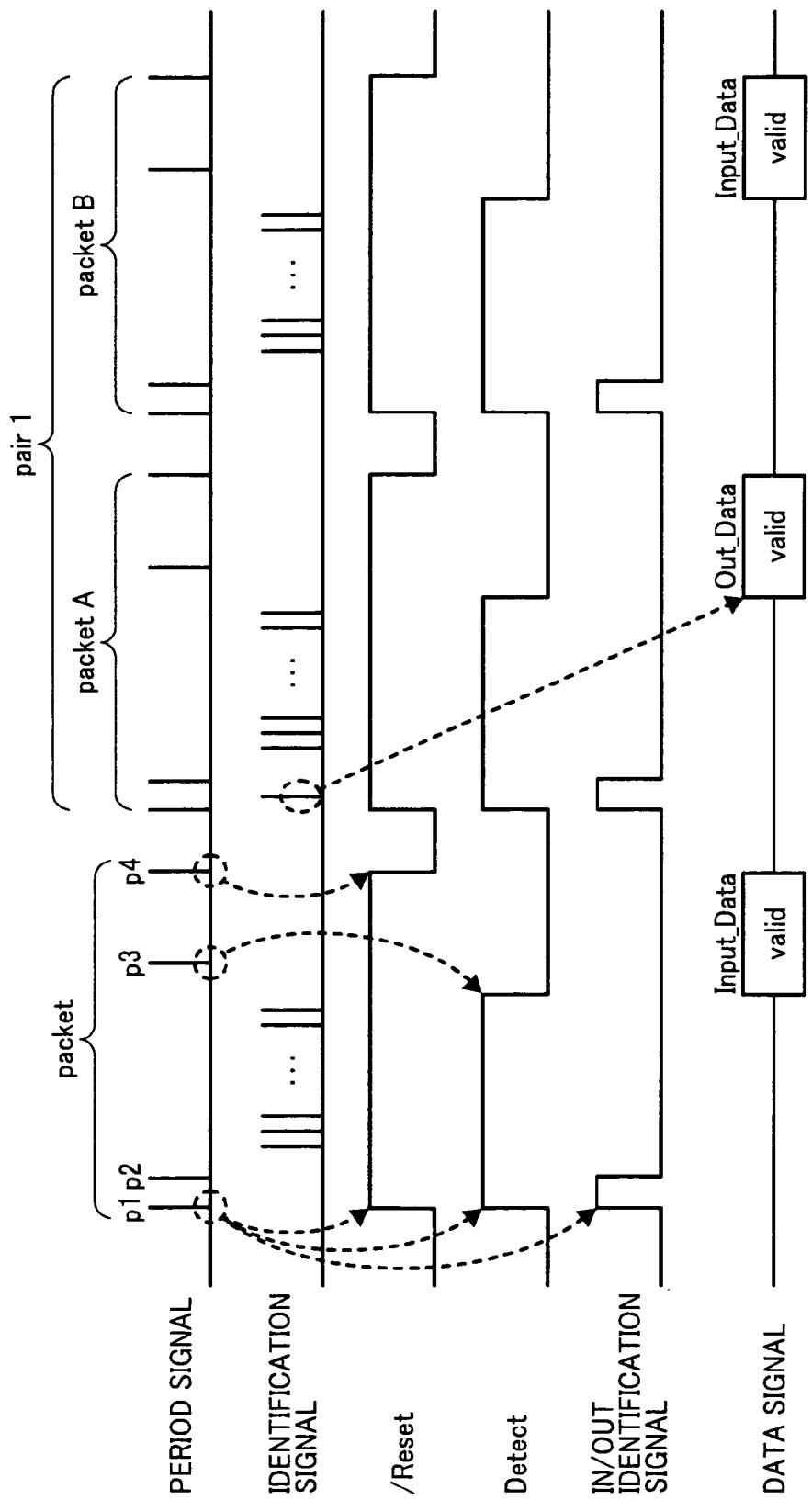
FIG. 3 is a time chart of one example of the control signal timing of the I/O identification control means.

Here, an example of the control signal timing of the I/O identification control means 3 in FIG. 2 is indicated in FIG. 3. Identification control of the I/O means is conducted between the period signals p1 to p4. The In/Out determination period for determining the status of the identification signal and specifying the input/output of data is defined between period signals p1 and p2; the identification valid period that takes the pulses of identification signals for identifying the I/O means as valid is defined between p2 and p3; and the period that takes the data of the data lines as valid is defined between p3 and p4. Further, the group of the series of signals comprising the period signal, the identification signals generated between period signals p1 to p4, and data signals shall be called a packet.

The input/output of data in the data valid period of the data line 6 is controlled by the status of the identification signal line 7 in the In/Out determination period. If pulse signals are generated on the identification signal line 7 in the In/Out determination period, the image forming control means 2 outputs the data of data line 6 to the appropriate drive means as drive data (output signals) of the appropriate drive means identified by the identification signals. If no pulse is generated, the data of the data line 6 is an input signal to the image forming control means 2, the appropriate means is detection means and the image forming control means 2 acquires the data in the data valid period as detection signals of the appropriate detection means.

Figure 4:
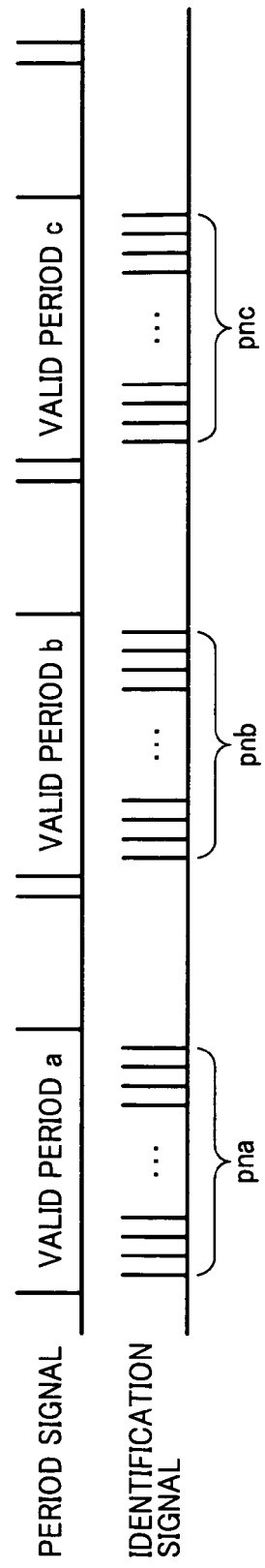
FIG. 4 is a time chart indicating the identification pulse of an identification signal that identifies the input/output means.

Moreover, by counting the number of identification signal pulses generated within the identification valid period, the appropriate input/output means can be identified from among the drive means 4a to 4x or the detection means 5a to 5n that the I/O identification control means 3 needs to identify. Here, an example of this identification is indicated in FIG. 4. For example, the pulse counts corresponding to the drive means 4a to 4x or the detection means 5a to 5n are determined in advance between the image forming control means 2 and the I/O identification control means 3 such that if the pulse count of the identification signal is pna in the identification valid period a, the drive means 4a or detection means 5a is identified and selected, and if the identification signal is pnb in the valid period b, the drive means 4b or detection means 5b is selected.

Further, by providing the In/Out determination period immediately prior to the identification period, the identification signals (pulse counts for identification) can be shared by the detection means and the drive means. At the same time that the identification period can be shortened by restricting the identification signal pulse count, the counter scale of the control block can be made small. For example, if the identification pulse count is n, it is the detection means 5n or the drive means 4n, and the identification signal in the In/Out determination period identifies whether it is the detection means 5n or the drive means 4n.

Figure 5:
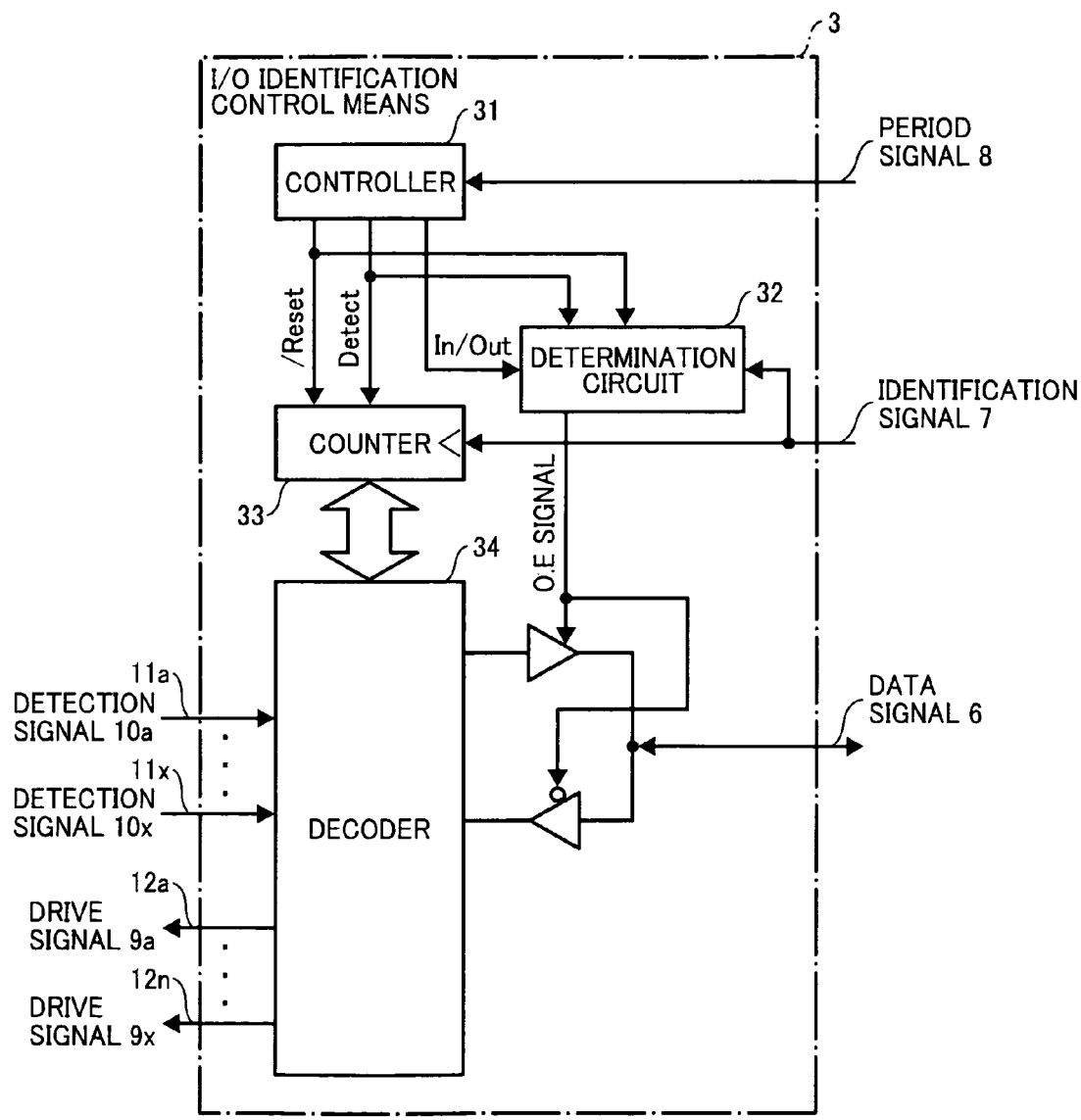
FIG. 5 is a block diagram indicating the configuration of the I/O identification control means.

FIG. 5 indicates the configuration of the I/O identification control means. In the same diagram, a controller 31 receives the period signal, and /Reset signals, Detect signals, and In/Out determination period signals are generated as indicated in FIG. 3. Although not indicated in FIG. 3, output enable signals (O.E), and the like that make the detection means data valid are also generated. The determination circuit 32 controls the input/output of data in the data valid period of the data line depending on the presence or absence of identification signal line pulses during the In/Out determination period. A counter 33 counts the number of pulses, which is identification line identification data, within the identification signal valid period determined by the /Reset signal and Detect signal produced by the controller 31, and outputs the count value to a decoder 34. If the determination circuit 32 determines that the data line data is input, the decoder 34 follows the counter value, and identifies and selects data of one of the detection means which is set in advance from the plurality of data lines (in1 to inX) 6. Using the previously described O.E signals, the selected detection data is output during the data valid period on the data line connected to the image forming control means. In this way, the I/O identification control means 3 receives the detection means and drive means data directed by the image forming control means as previously described. Consequently, there is no problem detecting at a certain determined time (timing) signals that vary periodically (rotation of belt, etc.), or signals (temperature changes) that do not vary within a short time period, but acquiring sensor signals and the like generated irregularly is problematic. Thus, many opportunities are provided to acquire irregularly generated signals. Delayed detection of irregularly generated signals can thereby be reduced. Here, irregularly generated signals are called signals of specified input means.

Figure 6:
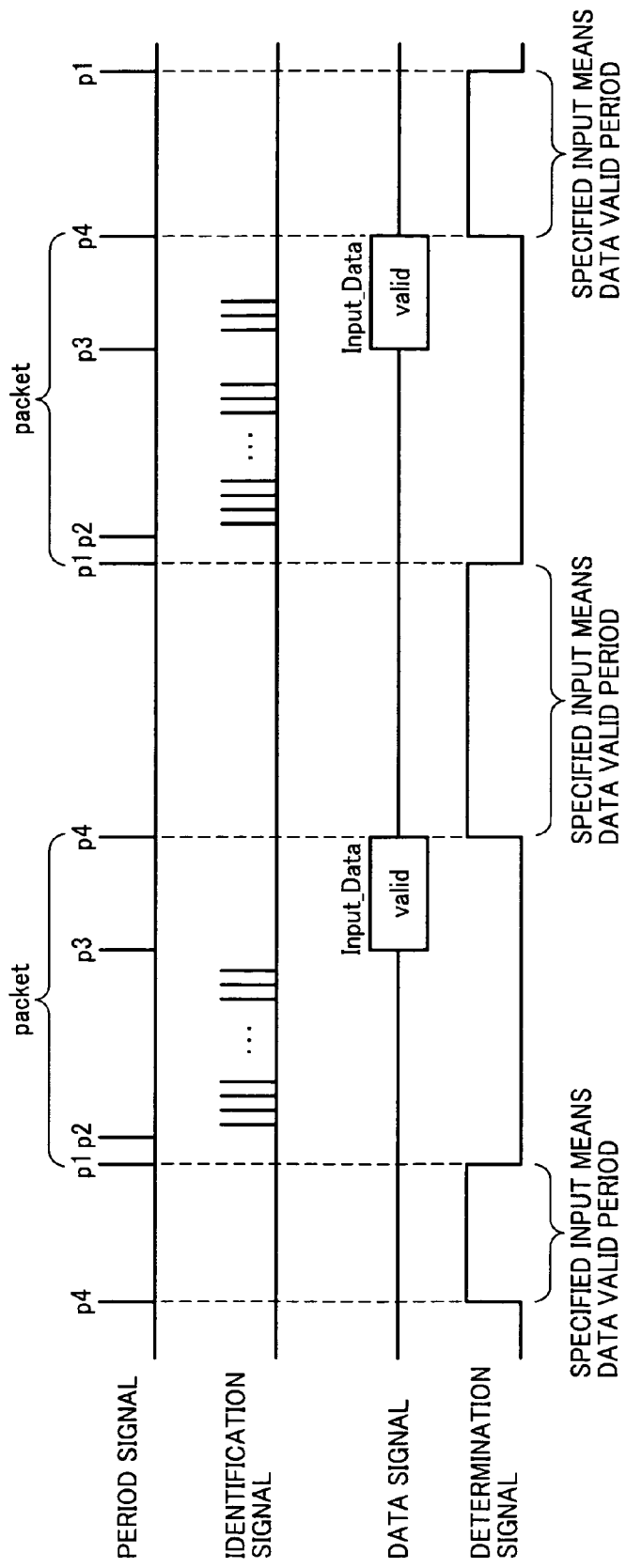
FIG. 6 is a time chart indicating one example of the control signal timing of the I/O identification control means in relation to the signals of specified input means.

FIG. 6 is a time chart indicating an example of the control signal timing of the I/O identification control means in relation to signals of specified input means. The data line of the period in which I/O identification control is not conducted (The period when the determination signal in the diagram is "H", called the "specified input means data valid period".) is opened in order to acquire (detect) signals of specified detection means (sensors and the like) generated irregularly. While the determination signal is "H", the system is in the state of the image forming control means and the specified input means being connected by the data line. Further, the specified input means also acquires signals during I/O identification control.

Figure 7:
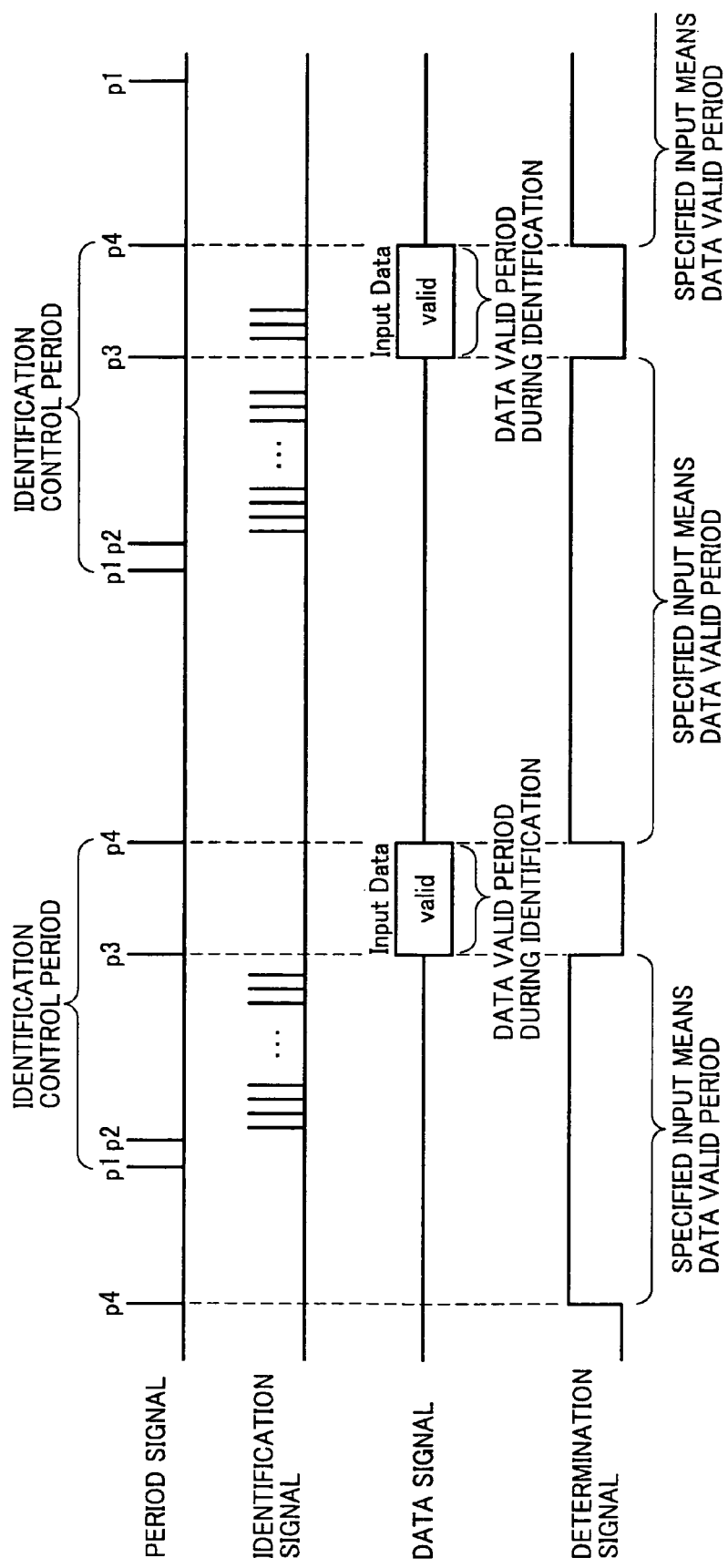
FIG. 7 is a time chart indicating another example of the control signal timing of the I/O identification control means in relation to the signals of specified input means.

FIG. 7 is a time chart indicating another example of the control signal timing of the I/O identification control means in relation to the signals of specified input means. In this diagram, even though it is during the I/O identification control period, the identified detection means or drive means can only occupy the data line during the data valid period of the period signals p3 and p4, and therefore, the data line at periods other than the data valid period are open in order to detect irregularly generated signals of the specified input means. While the determination signal indicated in FIG. 7 is "H", the system is in the state of the image forming control means and the specified input means being connected by the data line. Because the connection is for a period longer than the period in which the identification control indicated in FIG. 6 is not conducted, the response delays can be minimized. Moreover, even if I/O identification is successive (the time from p4 to p1 is short), the signal of the specified input means can be detected. Further, if there are a plurality of specified input means that generate irregular signals, the data line at periods other than the I/O identification control period is segmented and assigned corresponding to the plurality of specified input means.

Figure 8:
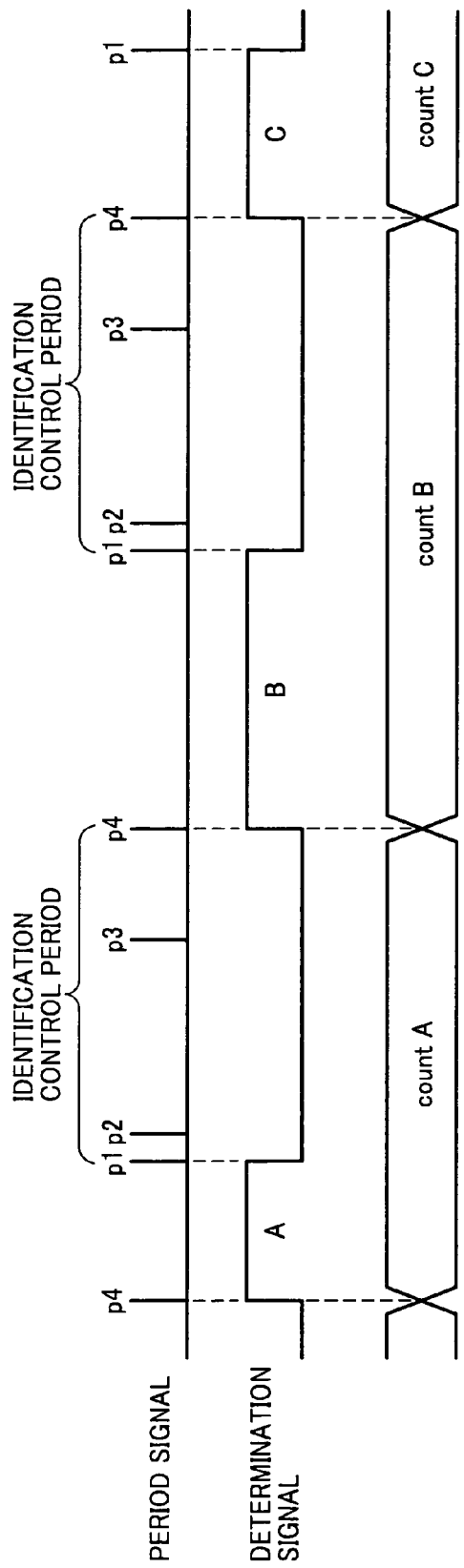
FIG. 8 is a time chart indicating another example of the control signal timing of the I/O identification control means in relation to the signals of specified input means.
Figure 11:
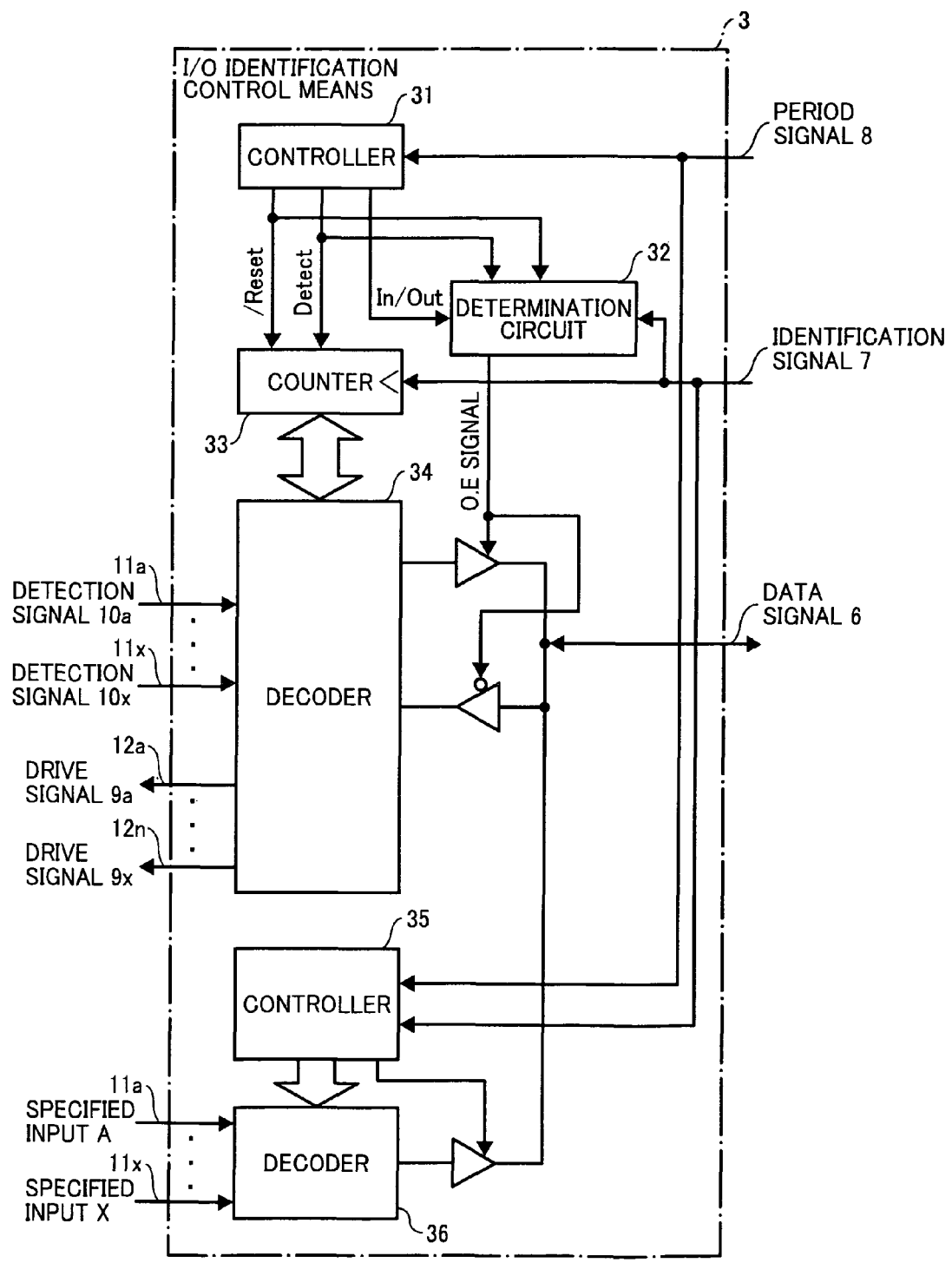
FIG. 11 is a block diagram indicating the configuration of another I/O identification control means.

FIG. 8 is a time chart indicating another example of the control signal timing of the I/O identification control means in relation to the signals of the specified input means. In the same diagram, when there are three specified input means A, B, C, the data line is open to different specified input means each time the I/O identification control period ends. The specified input means A is connected with the image forming means by the data line in the interval A of the determination signal, the specified input means B is connected during the interval B, and the specified input means C is connected during the interval C. The switching of specified input means is conducted by providing the I/O identification control means with a controller 35 for specified input means control and a decoder 36, as indicated in FIG. 11. Specifically, the specified input means is switched by the decoder 36 using the determination signal generated by the controller 35 and the count value of counted p4 pulses. The count restarts when the count value has reached a specified input number.

Figure 10:
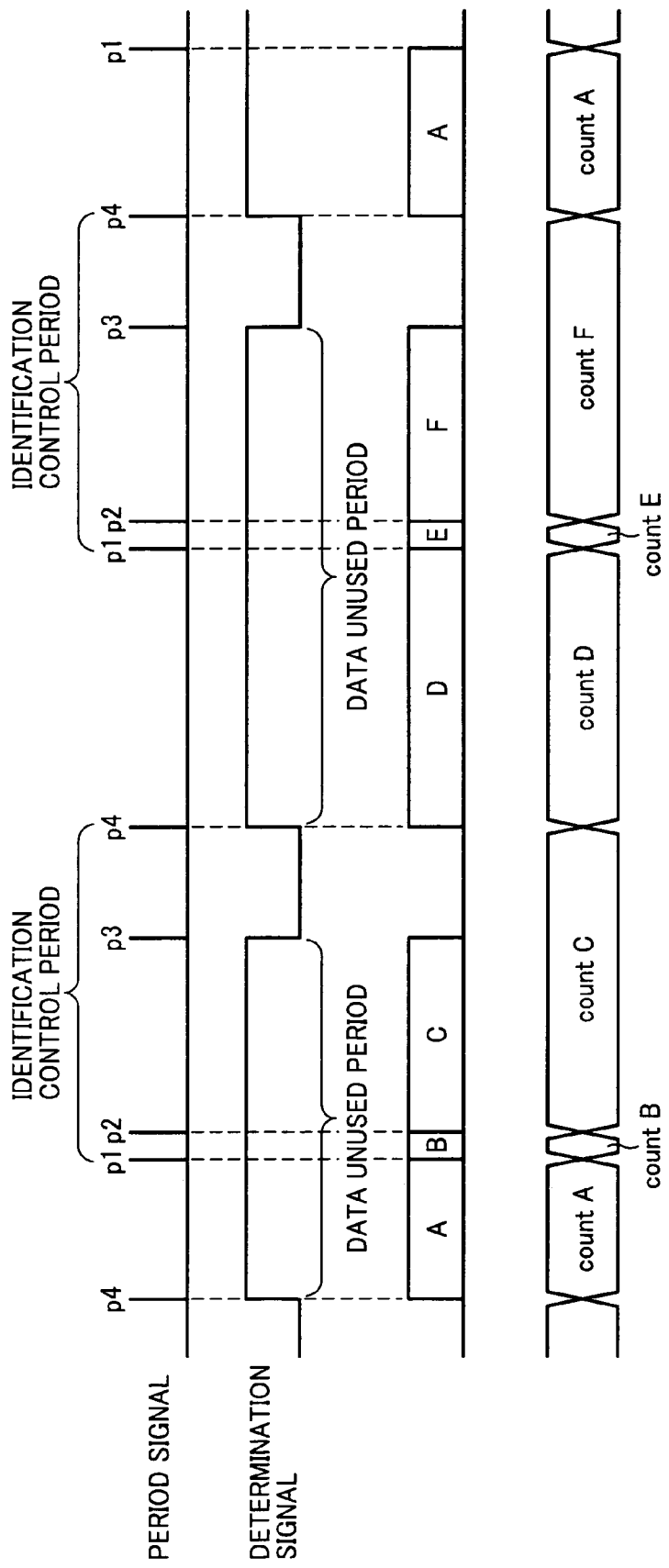
FIG. 10 is a time chart indicating another example of the control signal timing of the I/O identification control means in relation to the signals of specified input means.

FIG. 10 is a time chart indicating another example of the control signal timing of the I/O identification control means in relation to the signal of the specified input means. In the same diagram, the period when the data line is unused (other than the data valid period during identification control) is divided into a plurality of segments in order to acquire data from the plurality of specified input means. Assuming six different specified input means A to F, as indicated in the same diagram, the periods when the data line is unused is open to the six different specified input means. Here, the period signal is used to divide and assign the unused periods of the data line to the plurality of specified input means. As indicated in the same diagram, the identification ID is modified and the plurality of specified input means are identified by counting the pulses (p4, p1, p2) of the period signals of the periods when the data [line] is unused. Switching the specified input means, as described above and indicated in FIG. 11, is conducted by providing the controller 35 for controlling the specified input means and the decoder 36. Specifically, the determination signal generated by the controller 35 and the counter that counts the period signal pulses other than those of p3 are used. The count restarts when the count value has reached a specified input number.

Figure 9:
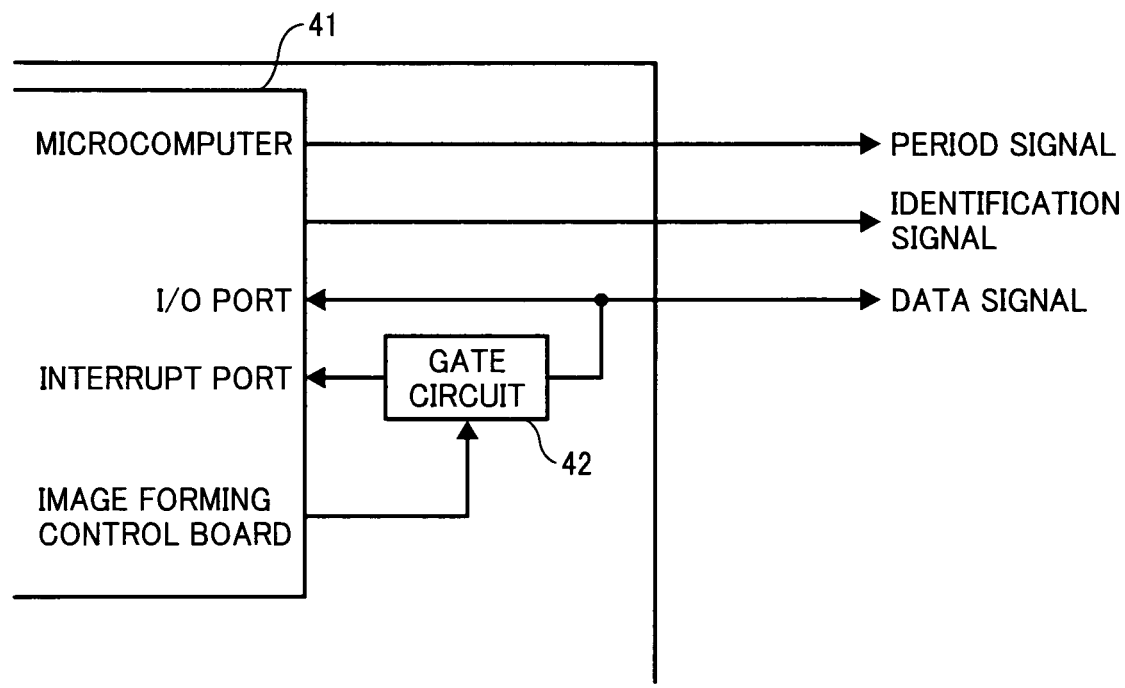
FIG. 9 is a block diagram indicating the configuration of another I/O identification control means.

Next, the assigning and use in processing of the specified input means described above will be summarized. As indicated in FIG. 9, the signal line used in I/O control is connected to the I/O port of a microcomputer 41 provided in the board of the image forming control means. The data line 6 is also connected to an interrupt port through a gate circuit 42. As described above, the gate control circuit 42 connects the data line 6 with the interrupt port in the period when the signals of the specified input means are valid. Other than in the aforementioned period, the data line 6 and the interrupt port are in an unconnected state. By inputting the determination signal and the count value for identifying the plurality of specified input means into the gate circuit 42, the signals of the specified input means that the image forming control means requires are connected to the interrupt port.

Moreover, the data acquisition periods of the specified input means are long and short as indicated in FIGS. 8 and 10. Data of specified input means with high priority interrupt processing can be acquired into a region with a long period. For example, detection signals that place a load on the apparatus until released, such as for paper jams and the like, are taken to be such specified input means, and are set up as valid in section B in FIG. 8 or section D in FIG. 10.

Further, the I/O identification control means related to the identification control of the input means identifies and controls the input means that do not require timing as an engine sequence of the image forming apparatus. Consequently, when the interrupt processing request is generated by a signal from the aforementioned specified input means, if the identification of the subsequent I/O control is the input means, control is conducted when interrupt processing of I/O control is finished. Moreover, if the target of identification control is output means, the I/O control means conducts drive control of the drive means at a timing (time) required by the engine sequence. Consequently, I/O control cannot be delayed even if an interrupt processing request is generated by signals from the aforementioned specified input means. A separate CPU from the one that directs the I/O identification control means is provided in the image forming means, and is configured to conduct interrupt processing. The aforementioned two CPUs are constructed on one chip using FPGA.

According to the image forming apparatus of the present invention, a data line in the period other than when identification control of the detection means and drive means is conducted, is used to acquire the data of the specified detection means as valid data. Thus, delays of the detection response time that relate to irregularly generated signals can be minimized by using the data line to acquire irregularly generated detection signals at times other than when conducting identification control of the detection means and drive means.

Various modifications will become possible for those skilled in the art after receiving the teachings of the present disclosure without departing from the scope thereof.

What is claimed is:

1. An image forming apparatus, comprising:
    an image forming control unit for controlling the operations of the apparatus as a whole;
    a plurality of detection units for detecting various states within the apparatus;
    a plurality of drive units for driving a plurality of actuators; and
    an identification control unit connected with the image forming control unit by:
        a single data line for transmitting/receiving detection signals from the plurality of detection units through the identification control unit to the image forming control unit and drive signals from the image forming control unit through the identification control unit to the plurality of drive units;
        a single identification signal line for transmitting identification signals that specify the input/output of the data line, the identification signals capable of specifying a detection unit and a drive unit from among the plurality of detection units and the plurality of drive units, wherein the identification signal line is a separate line from the data line; and
        a single period signal line for transmitting period signals that define a data valid period of the data line and a signal valid period of the identification signal line for specifying the input/output of data and the detection or drive unit associated with a particular period signal, wherein the period signal line is a separate line from the data line and identification signal line;
    the identification control unit identifying appropriate detection or drive units from the identification signals, and making data on the data line valid as data of the appropriate detection or drive units,
wherein the identification control unit uses the data line in a period other than when conducting identification control of the detection or drive units to acquire the data of the specified detection units as valid data.

2. The image forming apparatus as claimed in claim 1, wherein the period other than when conducting identification control of the detection or drive units is divided, and the data of the plurality of specified detection units is acquired according to the divided periods.

3. The image forming apparatus as claimed in claim 1, wherein signals of the specified detection units are treated as interrupt signals.

4. An image forming apparatus, comprising:
an image forming control unit for controlling the operations of the apparatus as a whole;
a plurality of detection units for detecting various states within the apparatus;
a plurality of drive units for driving a plurality of actuators; and
an identification control unit connected with the image forming control unit by:
a single data line for transmitting/receiving detection signals from the plurality of detection units through the identification control unit to the image forming control unit and drive signals from the image forming control unit through the identification control unit to the plurality of drive units;
a single identification signal line for transmitting identification signals that specify the input/output of the data line, the identification signals capable of specifying a detection unit and a drive unit from among the plurality of detection units and the plurality of drive units, wherein the identification signal line is a separate line from the data line; and
a single period signal line for transmitting period signals that define a data valid period of the data line and a signal valid period of the identification signal line for specifying the input/output of data and the detection or drive unit associated with a particular period signal, wherein the period signal line is a separate line from the data line and identification signal line;
the identification control unit identifying appropriate detection or drive units from the identification signals, and making data on the data line valid as data of the appropriate detection or drive units,
wherein the identification control unit uses an unused period of the data line to acquire the data of the specified detection units as valid data.

5. The image forming apparatus as claimed in claim 4, wherein the unused period of the data line is divided, and the data of the plurality of specified detection units is acquired according to the divided periods.

6. The image forming apparatus as claimed in claim 5, wherein the unused period of the data line is divided using the period signals.

7. The image forming apparatus as claimed in claim 6, wherein a CPU other than the CPU used for identification control of the detection or drive units is provided in the image forming control units, and identification control of the detection or drive units is continued even when signals from the specified detection units treated as interrupt signals are acquired and response processing therefor is conducted.

8. The image forming apparatus as claimed in claim 4, wherein when dividing the unused period of the data line, data of the detection units with high interrupt priority is acquired during divided periods that are long.

9. The image forming apparatus as claimed in claim 8, wherein a CPU other than the CPU used for identification control of the detection or drive units is provided in the image forming control unit, and identification control of the detection or drive units is continued even when signals from the specified detection units treated as interrupt signals are acquired and response processing therefor is conducted.

10. The image forming apparatus as claimed in claim 4, wherein signals of the specified detection units are treated as interrupt signals.

11. An image forming apparatus, comprising:
an image forming controller for controlling the operations of the apparatus as a whole;
a plurality of detectors for detecting various states within the apparatus serving as a plurality of inputs/outputs in relation to the image forming controller;
a plurality of drivers for driving a plurality of actuators such as motors, solenoids and the like; and
an identification controller connected with the image forming controller by:
a single data line for transmitting/receiving detection signals from the plurality of detectors through the identification controller to the image forming controller and drive signals from the image forming controller through the identification controller to the plurality of drivers;
a single identification signal line for transmitting identification signals that specify the input/output of the data line, the identification signals capable of specifying a detector and a driver from among the plurality of detectors and the plurality of drivers, wherein the identification signal line is a separate line from the data line; and
a single period signal line for transmitting period signals that define a data valid period of the data line and a signal valid period of the identification signal line for specifying the input/output of data and the specified detector or driver, wherein the period signal line is a separate line from the data line and identification signal line;
the identification controller identifying an appropriate detector or driver from the identification signals, and making data on the data line valid as data of the appropriate detector or driver,
wherein the identification controller uses the data line in a period other than when conducting identification control of the specified detector or driver to acquire the data of the specified detector as valid data.

* * * * *